United States Patent [19]

Zeitraeg

[11] 4,371,962
[45] Feb. 1, 1983

[54] CIRCUIT ARRANGEMENT FOR COMPENSATING PHASE DIFFERENCES OF NON-SYNCHRONOUS CLOCK PULSE RATES OF A TELECOMMUNICATION SYSTEM

[75] Inventor: Rolf Zeitraeg, Munich, Fed. Rep. of Germany

[73] Assignee: Siemens Aktiengesellschaft, Berlin & Munich, Fed. Rep. of Germany

[21] Appl. No.: 184,770

[22] Filed: Sep. 8, 1980

[30] Foreign Application Priority Data

Sep. 12, 1979 [DE] Fed. Rep. of Germany ....... 2936938

[51] Int. Cl.³ .......................... H04J 3/06; H04L 7/04
[52] U.S. Cl. ..................................... 370/100; 375/106
[58] Field of Search ................ 370/100; 375/106, 111, 375/118

[56] References Cited

U.S. PATENT DOCUMENTS 4,158,107 6/1979 Nicholas .............................. 370/102
4,290,135 9/1981 Zemanek .............................. 370/100

FOREIGN PATENT DOCUMENTS 2641488 3/1978 Fed. Rep. of Germany .

Primary Examiner—Douglas W. Olms

[57] ABSTRACT

A pulse coded time division multiplex (PCM) telecommunication system has two non-synchronous clock pulse trains for controlling information transfer and switching operations, respectively. In a circuit arrangement for compensating phase differences resulting from deviations between both clock pulse trains there is arranged an intermediate store for externally controlled buffering of PCM words for half of a pulse frame and connected thereto a buffer store for internally controlled buffering of PCM words for a full pulse frame. The intermediate store is designed for two modes of operation under control of the external clock pulse train. In an active mode during one cycle at first a stored PCM word is read out and is then replaced by a new PCM word. In the second mode the same PCM word first is temporarily buffered and immediately read out thereafter. Change of operation is controlled by a control unit monitoring addresses for alternate read operations and write operations of the buffer store of a minimum off-set of selected addresses to obtain by skipping of half of a pulse frame sufficient off-set without continuous uncontrolled slippage losses.

4 Claims, 2 Drawing Figures

CIRCUIT ARRANGEMENT FOR COMPENSATING PHASE DIFFERENCES OF NON-SYNCHRONOUS CLOCK PULSE RATES OF A TELECOMMUNICATION SYSTEM

BACKGROUND OF THE INVENTION

The invention is related to a pulse coded time division multiplex (PCM) telecommunication system, especially a telephone system. More specifically, the invention is related to a circuit arrangement for compensating phase differences resulting from deviations between rates of an external clock pulse train controlling information transfer across an incoming transmission line and of a non-synchronous internal clock pulse train controlling switching operations of an exchange.

In particular for non-synchronous, especially plesiochronous operation of an external transmission line and the exchange system, such circuit arrangements comprise a small intermediate store which receives pieces of PCM information from the transmission line and a buffer memory connected by its input side to the intermediate store. The output side of the buffer memory is coupled to a switching network of the exchange. Buffering of incoming PCM information serves to compensate a phase difference caused by frequency deviations of the external and the internal clock pulse rates.

A known circuit arrangement of this type is described in German Auslegeschrift No. 2,641,488. There is provided an intermediate store for intercepting phase fluctuations of the external line clock pulse rate. The storage possesses a storage capacity corresponding to the likely maximum fluctuation range of the phase position of this external clock pulse rate. In a preferred embodiment, a storage capacity of 8 PCM words is implemented for balancing fluctuation of ±4 PCM words. During the operation of this intermediate store due to a frequency difference between the external line clock pulse rate and the internal exchange clock pulse rate, the theoretical off-set of four storage locations alternately selected for read operations and write operations can become lower. When such frequency difference is maintained for a plurality of cycles, write-in times and read-out times with respect to a specific storage location can move towards one another to such an extent that directly adjacent storage locations are affected by consecutive write-in and read-out operations.

If this state has arisen due to a higher external clock pulse rate of the exchange system, read-out operations from the intermediate store are effected at a frequency twice as high as normal in using a second bit-clock-pulse during the exchange system cycle for another read-out. On the contrary, if the internal clock pulse rate is higher, read-out is effected several times consecutively from one and the same storage location. Following to an extraordinary read-out of this kind from the intermediate store, the times of write-in and read-out operations with regard to one and the same storage location have been separated with sufficient extent to avoid overlapping.

Evidently, the control of this extraordinary read-out operation is somewhat complicated. Positive or negative frequency differences have to be evaluated. Additionally, starting time and duration of the extraordinary operation have to be taken into account. All these measures require a relatively large control outlay.

Therefore, it is an object of the present invention to provide an improved circuit arrangement for compensating phase differences with respect to processing PCM information in such a plesiochronous telecommunication system.

SUMMARY OF THE INVENTION

In the present invention a circuit arrangement for compensating phase differences resulting from deviations between an external clock pulse train controlling information transfer across an incoming transmission line and a non-synchronous internal clock pulse train controlling switching operations of an exchange is arranged between the incoming transmission line for serial transmission of PCM information and an outgoing transmission line to the exchange for parallel transmission of PCM words. A PCM word corresponds to PCM information sampled from one speech channel and being transferred in one channel time slot.

There are provided first storage means for consecutively buffering PCM words for a half of a pulse frame having parallel data inputs and respective data outputs for one PCM word. The first storage means are designed for two modes of operation, an active mode and a non-active mode. In the active mode during one channel time slot defined by the external clock pulse train at first a buffered PCM word is read out from a selected storage location. Then a new PCM word separated from the previously stored PCM word by a half of a pulse frame is written into the same selected storage location. In the non-active mode, also during one channel time slot, the one and the same PCM word first is temporarily buffered and read out thereafter.

Furthermore, there is arranged an intermediate register having a capacity for one PCM word and for a binary coded channel address. This register has corresponding parallel data inputs and outputs and parallel address inputs and outputs, wherein the data inputs are connected in parallel to respective ones of data outputs of the first storage means.

Second storage means are provided for consecutively storing PCM words of an entire pulse frame under control of the internal clock pulse frame. Parallel data inputs of the second storage means are connected to data outputs of the intermediate register and data outputs of the second storage means are connected to an outgoing transmission line.

Associated with the first storage means and the intermediate register there are arranged means for generating consecutive binary coded channel addresses of an entire pulse frame under control of the external clock pulse train. These means have parallel address outputs for channel address bits which outputs are connected in parallel to respective address inputs of both the first storage means and the intermediate register.

The mode of operation of the first storage means is determined by control means monitoring a minimum off-set of addresses selected for read operations and write operations of the second storage means. In case that a current off-set is lower than the predetermined minimum off-set, the mode of operation of the first storage means is changed and the most significant bit of a full channel address is inverted.

BRIEF DESCRIPTION OF THE DRAWINGS

A better understanding of the invention may be had by reference to the following description of a preferred embodiment in conjunction with the accompanying drawings, in which.

DETAILED DESCRIPTION OF THE PREFERRED EMBODIMENT

Figure 1:
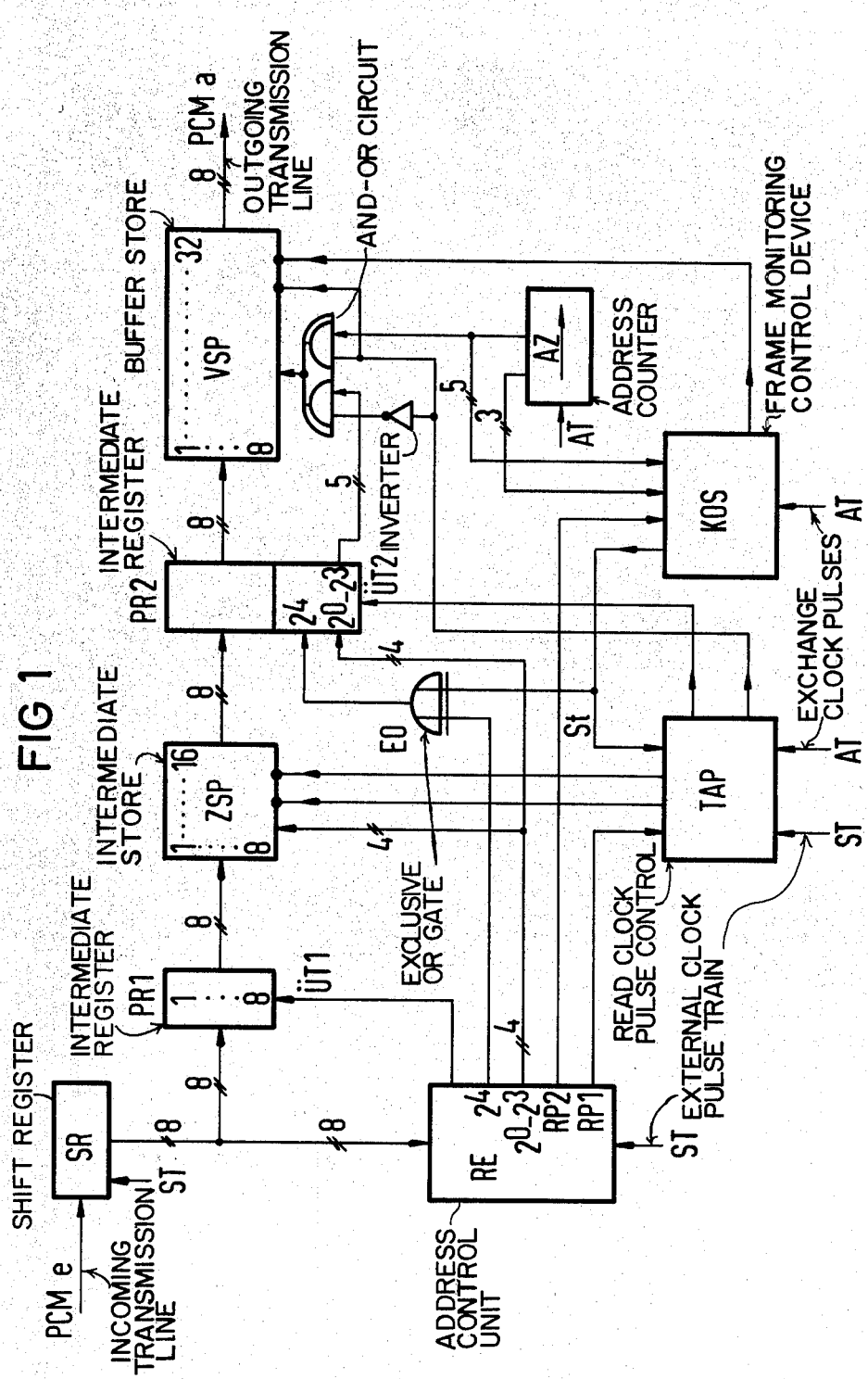
FIG. 1 is a block circuit diagram of a circuit arrangement for compensating plesiochronous clock pulse rates of a PCM telecommunication system, in accordance with the present invention.

In FIG. 1 there is schematically shown an incoming transmission line PCM e representing an incoming pair of wires and carrying pieces of PCM information in serial form. The transmission line is connected to a shift register SR which receives the pieces of PCM information. The shift register is triggered by an external clock pulse train ST of the transmission line and performs series-to-parallel conversion of the pieces of PCM information into PCM words associated with a respective speech channel of a pulse frame. For transmitting a PCM word comprising eight bits of PCM information outputs of this shift register are connected in parallel with inputs of a first intermediate register PR1 having a capacity for one PCM word. According to the word-by-word transfer controlled by a transfer pulse UT1 a stored PCM word is being buffered for a period of time defined by eight external clock pulses. The outputs of the intermediate register PR1 are connected in parallel with an intermediate store ZSP to transfer a read-out PCM word into this store.

Figure 2:
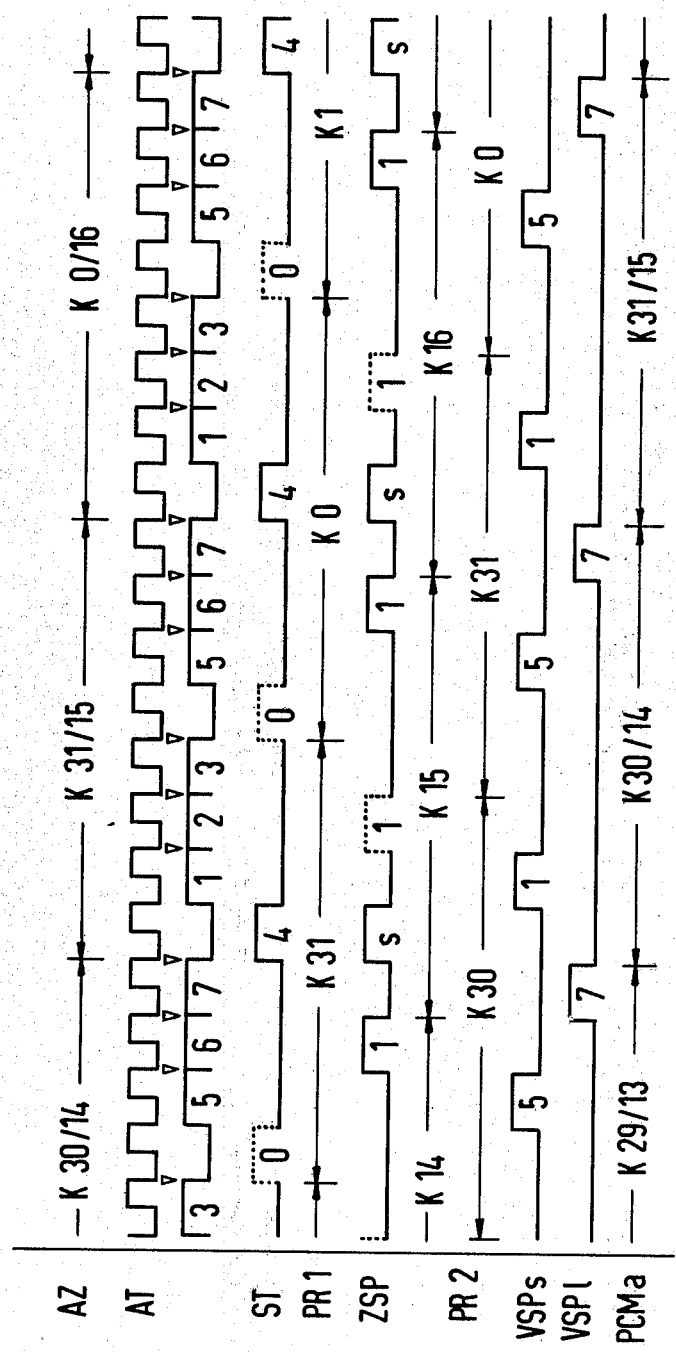
FIG. 2 is a time diagram showing the time relationships of operations of the different subunits of the circuit arrangement represented in FIG. 1.

The intermediate store ZSP possesses a storage capacity for PCM words of half of a pulse frame wherein a pulse frame is defined by the number of speech channels consecutively sampled during one sampling interval. Being based on a 30/32 PCM telecommunication system the intermediate store ZSP is composed of 16 storage locations, each of these locations comprising eight bits for one PCM word. A write operation from the intermediate register PR1 into the intermediate store ZSP is controlled by external line clock pulses ST which occur in the middle of the corresponding channel time interval. This is to be seen from pulse diagrams shown in FIG. 2 by comparing lines which are correspondingly designated by ST, PR1 and ZSP. Line PR1 of FIG. 2 illustrates the consecutive order and duration of specific channel time intervals, here those of channels K31, K0 and K1 and their position under control of the external clock pulse train. Line ST illustrates examples of line clock pulses occurring within these time intervals, and in particular, clock pulses which are used as write control pulses. Line ZSP illustrates the timely order of operations of the intermediate store ZSP, i.e. shows in consecutive order time slots 1 for read operations and time slots s for write operations.

Furthermore, there is provided an address control unit RE having inputs connected to the outputs of the shift register SR for receiving the PCM words read out from this register. This address control unit monitors PCM words in respect of a frame code word representing the beginning of a pulse frame. Derived from the occurrence of this control word and in combination with the external clock pulse train the address control unit RE supplies time channel addresses which consist of five bits for an entire pulse frame of 32 PCM words. Four lower significant address bits $2^0$ to $2^3$ are used to address one of the 16 storage locations of the intermediate store ZSP.

The intermediate store ZSP can assume two alternative modes of operation, a non-active mode and an active mode. In the non-active mode of the intermediate store a PCM word currently stored is read out already two bit intervals immediately following the respective write operation. This type of operation is indicated in FIG. 2 in line ZSP by read-out pulses 1, represented in broken lines, which pulses follow write pulses s. In the second mode, the active mode of the intermediate store ZSP read-out pulses 1, represented in solid lines, occur two bit intervals prior to write pulses s. In this mode a read operation always refers to a PCM word which has been written into the respective storage location half a pulse frame previously.

The intermediate store ZSP is switched from one operative mode to the other under control of further control device TAP for adjusting read clock pulses. This device operates under the control of a control signal St which is generated by a further control device KOS which will be discussed in detail later. The control signal St represents a control bit which serves to invert the most significant bit of a read clock pulse address comprising three bits determining clock pulses 1 through 7 such that this address indicates either a second clock pulse 2 or a sixth clock pulse 6 to be selected within one channel time interval for a read operation from the intermediate store ZSP. The position of these clock pulses is indicated in line AT of FIG. 2 illustrating the internal clock pulse train and the derived operational clock pulse 1 through 7. A further control measure used for switching the intermediate store ZSP from one operative mode into the other will be discussed later in the description.

A second intermediate register PR2 is connected by data inputs to the output side of the intermediate store ZSP and is supplied with information read out from the intermediate store ZSP. The register is capable of receiving a PCM word in parallel together with a complete time channel address, represented by address bits $2^0$ through $2^4$. Connected to the output side of the second intermediate register PR2 there is provided a buffer store VSP composed of 32 storage locations of 8 bit length for storing PCM words of a full pulse frame. Its storage locations are selected on the basis of a drive address supplied by the second intermediate register PR2, as indicated by line VSP s in FIG. 2 under control of either transfer clock pulses 5 or transfer clock pulses 1. Under control of the control device TAP for adjusting read clock pulses it is determined which of these transfer clock pulse trains is used for write operations into the buffer store VSP, whereas a read operation from the buffer store VSP always is performed coinciding with clock pulses 7 as indicated in line VSP 1 of FIG. 2.

If the intermediate store ZSP is in its non-active mode, as has been mentioned, during one channel time interval the external line clock pulse 4 is used for write-in and the external line clock pulse 6 is used for read-out of the same storage location, as to be seen from line ZSP in FIG. 2. This means, concerning the operation of the buffer store VSP, that a PCM word of time channel 10, for example, read out from the intermediate store ZSP is transferred via the second intermediate register PR2 to the buffer store VSP and is stored in storage location 10 which is selected at that time.

On the other hand, in the active mode of the intermediate store ZSP information being read out from a storage location under control of external line clock pulses 2 during a specific time slot, represents a PCM word which has to be written into a different storage location of the buffer store. This storage location is associated with the PCM word which is positioned a half a pulse frame prior to that channel time slot in question. Assuming the channel time slot relates again to channel K10, in this case, instead of selecting the storage location 10 of the buffer store VSP, the PCM word must now be written into storage location 26, since this storage location, considered in operating sequence, preceeds the storage location 10 by sixteen time channel slots which correspond to a half of a pulse frame.

For performing this selecting operation, a further measure has to be carried out in switching the intermediate store ZSP from one operating mode into the other, whereby the most significant bit $2^4$ of the drive address is inverted. This is effected under control of an EXCLUSIVE-OR GATE EO which is supplied by this most significant bit $2^4$, on the one hand, and by the described control signal St representing an actual switch over command, on the other hand. Change of the operating mode of the intermediate store ZSP is necessary whenever due to large phase jumps or continuous phase changes between the external line clock pulse rate and the internal exchange clock pulse rate, write operations and read operations concerning one and the same storage of the buffer store VSP could overlap in time. This situation is hazardous. In case of a sudden phase jump which exceeds one bit and which could not be intercepted because of the aforementioned hysteresis during a switch over between the two write clock pulse trains of the buffer store, this overlapping might be continuously repeated, thus resulting in continuous slippage losses. If, however, under such critical circumstances, in accordance with the present invention, the operating mode of the intermediate store ZSP is switched, just one solitary slippage loss may be possible. This is achieved since a read operation into a storage location of the buffer store VSP is displaced from the succeeding write operation by an address off-set corresponding to half of a pulse frame whenever the operative mode of the intermediate store ZSP is changed, thus preventing further slippage losses.

The appropriate moment of time to switch the operating mode of the intermediate store ZSP is determined by the control device KOS. Assuming that the intermediate store ZSP is in its non-active mode, the end of a pulse frame transmitted along the incoming transmission line PCM e and triggered by the external line clock pulse train is monitored. To be more precise, a time interval T255 corresponding to the eighth bit of the 32nd PCM word of a pulse frame and the succeeding time interval T0, both associated with the external clock pulse train ST are monitored for coinciding with bit time intervals 4 through 7 of a channel time interval K31 which timely position is determined by the internal exchange clock pulse train AT. Whereas in the active mode of the intermediate store ZSP, monitoring is carried out of the coincidence of the end of the pulse frame transmitted on the incoming transmission line PCM e and the clock pulse time intervals 4 through 7 of the channel time interval K15 determined by the internal exchange clock pulse train AT. This monitoring insures that a change from one operating mode of the intermediate store to the other occurs prior to an overlapping of read operations and write operations in the buffer store VSP and combined with a specific time of performing. Whenever such a change takes place a complete channel content still can be transferred to the buffer store VSP. Furthermore, the aforementioned selection of the comparison times insures that a slippage loss which can arise in the buffer store due to a change of operating modes coincides with the beginning of processing an entire pulse frame. This is of particular significance when the switching process relates to items of PCM information which require a plurality of time channels for each connection.

Whereas the write operations into the buffer store VSP described form an essential feature of the present invention because of the cooperation with the operations of the intermediate store ZSP and the second intermediate register PR2, the read operations from the buffer store are controlled as with a conventional circuit arrangement, and can be described briefly.

An address counter AZ is triggered by the internal exchange clock pulse train AT. The current state of this counter determines the present timely position of time channel slots associated with that clock pulse train. To monitor this state by the control device KOS, as described, outputs of the counter stages of the address counter are connected in parallel to inputs of the control device KOS. The five most significant outputs of the counter supplying a present complete address for a channel time slot are coupled to the buffer store VSP by five address lines. These address lines correspond to the five address lines which are connected to address outputs of the second intermediate register PR2. Both groups of address lines are logically linked by an AND-OR circuit for selecting either a read or a write address, and are thus selectively coupled to address inputs of the buffer store. Selecting is controlled by a selection signal supplied by the control device TAP to both AND gates in parallel in normal condition and in inverted condition, respectively.

Furthermore, it may be mentioned that the different control units have been described just to that extent to explain interactions and cooperations with the related devices. As far as not described in detail these devices are of conventional and straight-forward design based on the principles represented, which are well known to those skilled in the art of telecommunication systems.

While the design of a circuit arrangement herein described before constitutes a preferred embodiment of the invention in incrementing a part of a 30/32 PCM telecommunication exchange system, it is to be understood that many changes, modifications, variations and other uses and applications of the subject invention will, however, become apparent to those skilled in the art after considering this specification and the accompanying drawings which disclose a preferred embodiment thereof. All such changes, modifications, variations and other uses and applications which do not depart from the spirit and scope of the invention are deemed to be covered by the invention which is limited only by the claims which follow.

What is claimed is:

1. Circuit arrangement for a pulse coded time division multiplex (PCM) telecommunication system for compensating phase differences resulting from deviations between rates of an external clock pulse train controlling transmission of information across an incoming transmission line and of a non-synchronous internal clock pulse train controlling switching operations of an exchange, said circuit arrangement being arranged between said incoming transmission line for serial transmission of PCM information and an outgoing transmission line connected to the exchange for parallel transmission of PCM words which correspond to PCM information sampled from one speech channel and being transferred in one channel time slot, comprising:

(a) first storage means for consecutively storing PCM words for half of a pulse frame and having parallel data inputs and respective data outputs for one PCM word, said first storage means being designed for two modes of operation, wherein during one channel time slot defined by said external clock pulse train in an active mode of operation at first a stored PCM word is read out from a selected storage location and then a new PCM word separated from the previously stored PCM word by a half of a pulse frame is written in, and in a non-active mode the same PCM word first is temporarily buffered and read out thereafter;

(b) an intermediate register having a capacity for one PCM word and for a binary coded channel address, and having corresponding parallel data inputs and outputs, and parallel address inputs and outputs, said data inputs being connected in parallel with respective ones of said data outputs of said first storage means;

(c) second storage means for consecutively storing PCM words of a full pulse frame under control of said internal clock pulse train and having parallel data inputs connected to said data outputs of said intermediate register, having data outputs connected to said outgoing transmission line and having address inputs;

(d) means for generating consecutive binary coded channel addresses of an entire pulse frame under control of said external clock pulse train and having parallel address outputs for channel address bits and connected in parallel with both respective address inputs of said first storage means and address inputs of said intermediate register; and (e) control means for determining the mode of operation of said first storage means dependent upon a minimum off-set of read addresses and write addresses for the second storage means, wherein the mode of operation of the first storage means is changed and the most significant bit of a full channel address is inverted whenever the current offset is lower than said minimum.

2. The circuit arrangement as recited in claim 1, further comprising:

(f) means for generating consecutive read addresses for the second storage means under control of the internal clock pulse train having a clock pulse input supplied with said clock pulses and parallel address outputs; and (g) read/write control means for controlling storage operations of the second storage means having first address inputs connected to the address outputs of the intermediate register for receiving a write address and second address inputs connected to said address outputs of said means for generating read addresses, having control means for alternately switching read address and a write address to address inputs of said second storage means and having enabling means for starting alternately a read operation and a write operation in said second storage means within one channel time slot.

3. The circuit arrangement as recited in claim 2, further comprising a further intermediate register having a storage capacity of one PCM word and having corresponding parallel data inputs and data outputs and a clock input, said data outputs being connected in parallel to respective data inputs of the first storage means for transferring a PCM word into said first storage means under control of a transfer pulse derived from the external clock pulse train occurring in the middle of the channel time slot.

4. The circuit arrangement as recited in claim 3, further comprising an input shift register controlled by the external clock pulse train, having a serial input coupled to the incoming transmission line and having parallel outputs connected in parallel to both data inputs of said further intermediate register and data inputs of the means for generating channel addresses.

* * * * *